No. 759,446. PATENTED MAY 10, 1904.
F. R. KEITH.
CAR FENDER.
APPLICATION FILED JUNE 22, 1903.
NO MODEL. 2 SHEETS—SHEET 1.
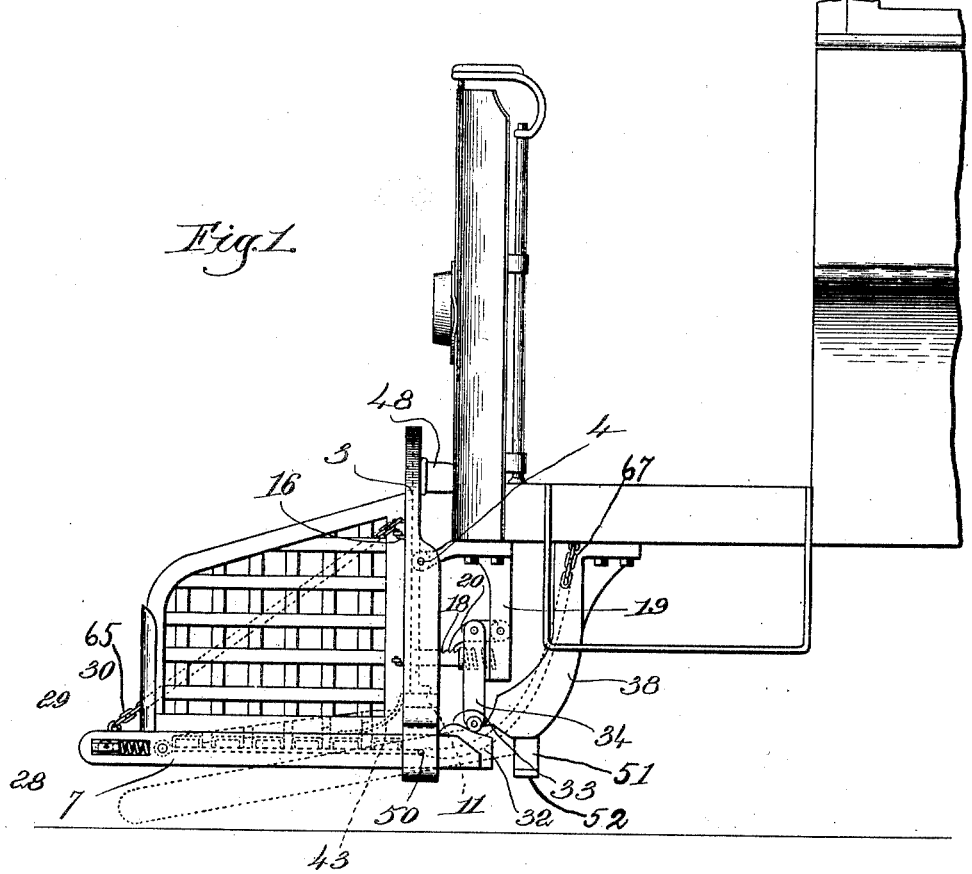
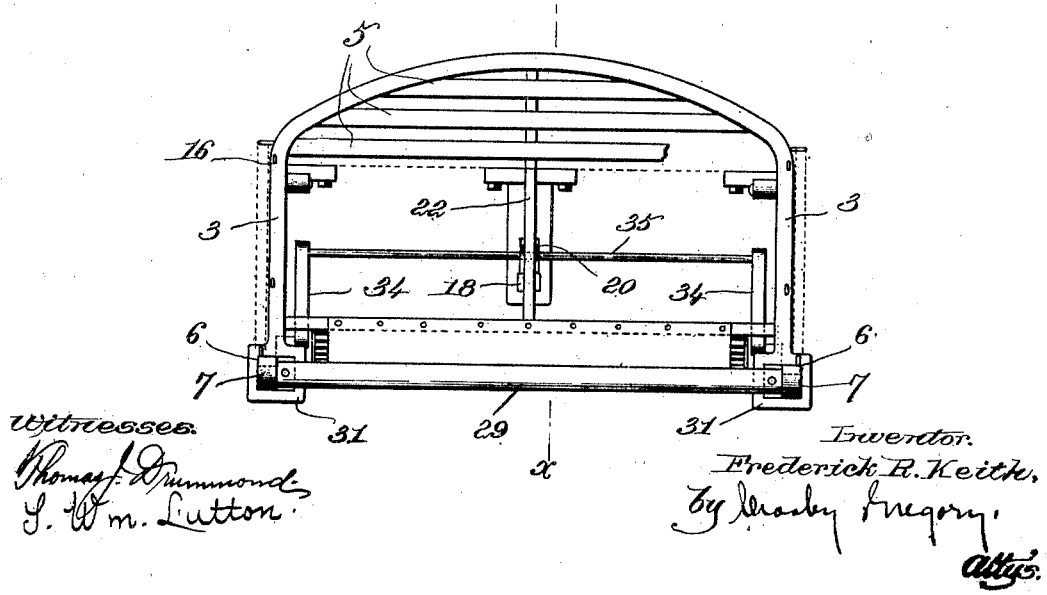

No. 759,446. PATENTED MAY 10, 1904.
F. R. KEITH.
CAR FENDER.
APPLICATION FILED JUNE 22, 1903.
NO MODEL. 2 SHEETS—SHEET 2.
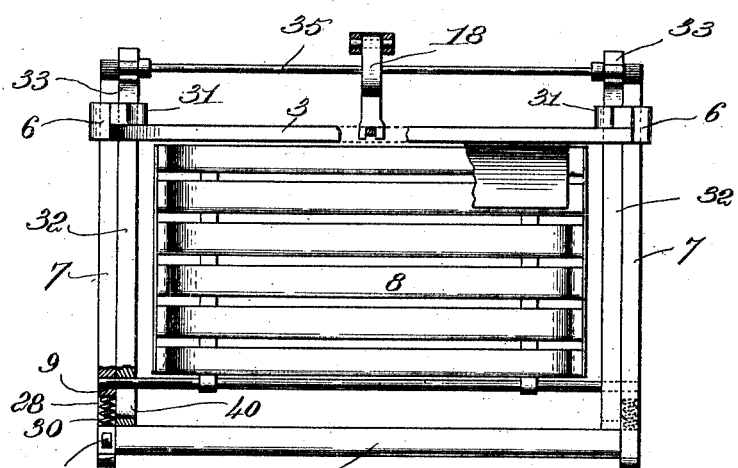
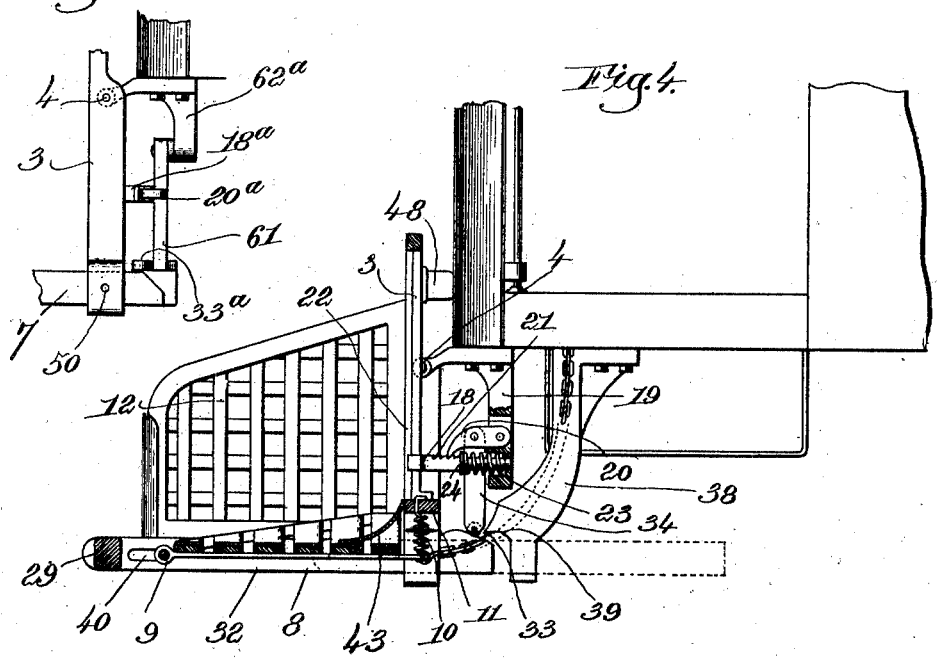

No. 759,446. Patented May 10, 1904.

UNITED STATES PATENT OFFICE.

FREDERICK R. KEITH, OF RANDOLPH, MASSACHUSETTS.

CAR-FENDER.

SPECIFICATION forming part of Letters Patent No. 759,446, dated May 10, 1904.

Application filed June 22, 1903. Serial No. 162,586. (No model.)

*To all whom it may concern:*

Be it known that I, FREDERICK R. KEITH, a citizen of the United States, residing at Randolph, county of Norfolk, State of Massachusetts, have invented an Improvement in Car-Fenders, of which the following description, in connection with the accompanying drawings, is a specification, like figures on the drawings representing like parts.

This invention relates to car-fenders, and has for its object to provide a novel fender which is normally positively held with its nose some distance above the rails, but which upon meeting an obstruction is automatically thrown into its lowered position or in position to pass under the obstacle and pick it up.

The fender is positively held in its elevated position by a suitable lock, and means are provided whereby when the fender strikes an obstacle the lock is automatically released, thus allowing the fender to drop into its lowered position.

Other features of my invention will be more fully hereinafter described and then pointed out in the claims.

Figure 1 is a side view of my improved fender. Fig. 2 is a front view thereof. Fig. 3 is a top plan view. Fig. 4 is a section on the line $x\,x$, Fig. 2. Fig. 5 shows a modification.

The fender comprises a back, a bottom, and, preferably, two sides. The back is illustrated as being formed by the frame 3, which is hinged to the car-body in any suitable way, as at 4, and which supports a plurality of slats 5. The lower ends of the sides of the frame have the eyes or bearings 6, in which the rear ends of the side pieces 7 are supported.

The bottom of the fender is designated by 8, and this may be of any usual or suitable construction. It is hinged at its front end upon the hinge-rod 9, which is supported by the side pieces 7, and at its rear end is yieldingly supported by suitable springs 10, which are secured at their upper ends to the cross-piece 11, extending across the frame 3.

The sides of the fender are designated by 12, and these may be of any suitable construction or shape and when used are preferably detachably secured to the frame 3 by any suitable means, such as eyes and staples 16. The sides of the fender-bottom 8 are bent upwardly, as shown best in Fig. 4, said upwardly-bent portions serving as stops to prevent the sides 12 of the fender from swinging inward. It is not absolutely necessary to use the sides 12, as these upwardly-bent portions of the fender-bottom may be sufficient to prevent obstacles caught on the fender from rolling off the sides thereof. The sides 12, therefore, may be dispensed with without in any way departing from the invention.

The fender is normally held with its bottom in a substantially horizontal position or elevated from the track, as shown in Figs. 1 and 4, by means of a locking bar or plunger 18, slidably mounted in a suitable support 19, secured to the car-body, and a locking-pawl 20, carried by some suitable fixed support and engaging notches or ratchet-teeth 21 in the locking-bar. It will be observed that the forward end of the locking-bar bears against the upright 22 of the frame 3, and therefore when the pawl is in engagement with the ratchet-teeth the fender is positively held from swinging backwardly about its pivot 4.

The lowering of the fender into dotted-line position in Fig. 1 when an obstacle is struck is automatic and is entirely accomplished without any action on the part of the motorman. I accomplish this by providing means for automatically unlocking or releasing the pawl 20 whenever the fender strikes an obstacle.

Extending across the front of the fender between the sides 7 and slidably mounted in slots 28 in said sides is a nose-bar 29, which is normally held at the front of the slots by the springs 30. Secured to this nose-bar and extending back parallel with the sides 7 and through suitable eyes or bearings 31, carried by the frame 3, are longitudinal members 32, which have at their rear ends cam-surfaces 33. For convenience I will hereinafter refer to said members 32 as "cam" members.

The cam-surfaces 33 are adapted to engage antifriction-rolls in the lower end of struts 34, which depend from the outer ends of a rod 35, extending through or secured to the pawl 20. With this construction it will be seen that when the nose-bar 29 is moved backwardly in the slots 28 the cam members 32 are carried backwardly and the cam-surfaces raise the plungers 34, and thus lift the pawl 20 out from engagement with the ratchet-teeth 21. Thereupon the fender immediately turns about the pivot 4 and swings into the dotted-line position, Fig. 1, thus carrying the nose of the fender close to the rails and in position to pick up the obstacle instead of running over it, as most fenders do.

I prefer to cushion the swinging movement of the fender and for this purpose have provided the spring 23, which surrounds the locking-bar 21 and is seated at one end in a socket in the support 19 and at the other end against a collar or pin 24 on the locking-bar.

38 designate bumpers so placed that as the fender swings into the dotted-line position, Fig. 1, the rear ends of the side pieces 7 engage the lower face 39 of said bumpers. These bumpers are so placed that they serve to stop or limit the swinging movement of the fender just as the nose thereof reaches the surface of the ground.

The cam members 32 stand on the inside of the side pieces 7 and are provided with suitable slots 40, through which the hinge-rod 9 passes, so as to permit the cam members to move backwardly.

It will be noted that when the fender-nose is elevated the fender-bottom stands substantially horizontal. (See Fig. 4.) When the nose of the fender strikes an obstacle and the fender is released and dropped toward the track, the fender-bottom, of course, would be inclined somewhat; but as soon as the obstacle lands in the fender its weight stretches the springs 10 and allows the back end of the fender-bottom to settle, so that the fender-bottom assumes a substantially horizontal position. This construction and operation aids materially in preventing the person or obstacle from rolling out of the fender immediately upon being caught, as would be the tendency if the fender-bottom were inclined downwardly.

In order to prevent any obstacle caught by the fender from rolling off the rear end of the bottom as the latter yields downwardly, I have provided the guard 43, which is hinged or otherwise secured to the cross-bar 11. This guard normally stands in the position shown in Fig. 4; but when the fender-bottom 8 swings downwardly it swings back into vertical position and closes the opening between the fender-bottom and the cross-piece 11.

48 designates a bumper or stop which engages the frame 3 and limits its swinging motion in a direction to carry the nose of the fender upwardly. When the fender is locked in its raised position, it is held from swinging in one direction by the bumper 48 and in the other direction by the pawl 20 and locking-bar 18 and is thus firmly held.

The side bars 7 are held in their extended or operative position by means of a locking-pin 50, which extends through apertures in the eyes 6 and into apertures in the said side bars. By removing the pins and unhooking the springs 10 and removing the sides 12 the fender-bottom may be moved backward into dotted-line position, Fig. 4, which is the folded position of the fender or that occupied when the fender is not in use. I prefer to make the bumpers 38 with suitable depending arms 51, having supporting-surfaces 52, on which the sides 7 rest and by which they are supported when in the position shown by dotted lines, Fig. 4.

In Figs. 1 and 4 I have shown the locking-pawl as engaging the top of the locking-bar and as being moved vertically by the cam-surfaces to disengage it from the locking-bar. In Fig. 5 I have shown a somewhat different construction. In this figure each of the side portions of the frame 3 has a rack $18^a$ extending rearwardly therefrom with which a pawl $20^a$, carried by a swinging arm 61, engages. This arm 61 is pivoted at its upper end to any suitable fixed support $62^a$ and at its lower end engages a cam-surface $33^a$ on the upper side of the cam member 32. This surface $33^a$ is so arranged that when the cam member 32 moves backwardly the arm 61 is swung transversely of the fender and the pawl $20^a$ disengaged from the rack $18^a$, thus allowing the fender to swing about the hinge 4 into the dotted-line position, Fig. 1.

In order to give the nose-bar an easy movement in the slots 28, I may, if desired, employ antifriction-rolls 94 on the said bar.

65 designates usual chains or other flexible supports which are commonly used to support the nose of the fender. 67 designates similar flexible connections which are secured at one end to the car-body and at the other end to the rear of the fender-bottom, these connections having for their object to limit the downward swinging movement of the fender. It will be noted that these connections 67 are secured to the car-body in such a position that they permit the fender-bottom to be moved into its dotted-line position, Fig. 4.

One of the important features in this invention is the fact that normally the fender is locked and rigidly held with its nose elevated; but when it strikes an obstacle the lock is released automatically and the nose of the fender swings downwardly toward the track and in position to pick up an obstacle.

I believe that I am the first to devise a fender which is normally locked and rigidly held in its elevated position, but which is automatically released and carried into its lowered position when it meets an obstacle without the necessity of any action whatever on the part of the motorman, and therefore I desire to claim this feature broadly.

While I have shown one way in which this result may be accomplished, my invention is not limited to the construction shown, as the details may be varied in various ways without departing in any way from the invention.

Having described my invention, what I claim as new, and desire to secure by Letters Patent, is—

1. In a device of the class described, a car-fender hinged to a car, a pawl-and-ratchet device to hold positively said fender in a fixed position with relation to the car and with its nose elevated, and automatic means to release the pawl when the fender strikes an obstacle.

2. A car-fender, means to pivot it to a car-body, a locking device to rigidly hold the nose of the fender elevated, a nose-bar extending across the nose of the fender and movable with relation to the latter, means whereby the movement of said nose-bar with relation to the fender releases the locking device and allows the nose of the fender to swing downwardly, and bumpers to engage the fender and limit its downward movement.

3. A car-fender having a nose-bar movable with relation thereto, a locking device to normally hold said fender with its nose elevated, means whereby the movement of the nose-bar with relation to the fender releases the lock and allows the fender to drop into its lowered position, and bumpers to engage the fender and limit its downward movement.

4. A car-fender, means to pivot the same to a car, a locking-bar slidably mounted in a fixed support and engaging said fender, a pawl carried by said support and coöperating with said locking-bar to hold the nose of the fender elevated, and automatic means to release the pawl when the fender strikes an obstacle.

5. A car-fender pivoted to a car, and having forwardly-extended side pieces, a nose-bar movably mounted in said side pieces, a notched locking-bar supported by the car and engaging the rear of the fender, a pawl coöperating with said locking-bar to hold the nose of the fender elevated, cam members connected to the nose-bar, and connections between said cam members and said pawl whereby when the nose-bar strikes an obstacle it and the cam members are moved backwardly relative to the fender and the pawl is released.

6. A car-fender pivoted to a car, a locking device to hold positively the nose of the car elevated, a movable nose-piece at the front of the fender, connections between said nose-piece and locking device whereby the movement of the latter upon being struck by an object releases the locking device, and bumpers to limit the backward and downward swinging movement of the fender.

7. A car-fender having a back hinged to a car-body, side pieces supported by said back, a fender-bottom hinged to said side pieces and yieldingly supported at its free end, and a guard hinged to the back and adapted to fill the gap between the bottom and back when the latter swings downwardly.

8. In a car-fender, a fender-back having bearings at its lower end, two side pieces slidably mounted in said bearings, and a bottom hinged at its front end to the side pieces and yieldingly supported at its rear end.

9. In a car-fender, a fender-frame forming the back of the fender and hinged to the car-body, side pieces slidably mounted in the lower end of said frame, a fender-bottom supported by the side pieces, a locking device to hold positively the nose of the fender elevated, a movable nose-piece carried by the nose end of the side bars, cam members secured to said nose-piece and also slidably mounted in the fender-frame, and connections between said cam-pieces and locking device whereby the movement of the nose-piece relative to the side bars releases the locking device, the construction being such that the side bars, cam members, and entire fender-bottom may be pushed backwardly through the bearings into position beneath the car-body.

10. In a device of the class described, a car-fender hinged to a car, a lock to hold the fender elevated from the track, and automatic means to release the lock when the fender strikes an obstacle, the bottom of the fender being pivoted at its front edge and yieldingly sustained at its rear edge, whereby as the nose of the fender is swung toward the rails the weight of an obstacle on the fender-bottom causes it to assume a horizontal position.

11. A car-fender having a bottom pivoted at the front of the fender, yielding means to sustain the rear edge of the bottom, and means to pivot the fender to the car, whereby the nose thereof may be moved toward and from the tracks, the fender-bottom being maintained in an approximately horizontal position when the nose of the fender is elevated and the yielding means allows it to assume a similar position when the nose of the fender is depressed and an obstacle is in said fender.

In testimony whereof I have signed my name to this specification in the presence of two subscribing witnesses.

FREDERICK R. KEITH.

Witnesses:
Louis C. Smith,
John C. Edwards.